(12) United States Patent
Emery

(10) Patent No.: US 6,228,494 B1
(45) Date of Patent: May 8, 2001

(54) METHOD TO REDUCE PARTIAL DISCHARGE IN HIGH VOLTAGE STATOR COIL'S ROEBEL FILLER

(75) Inventor: Franklin T. Emery, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/203,732

(22) Filed: Dec. 2, 1998

(51) Int. Cl.[7] .................. B32B 15/14; B32B 15/08; B32B 27/04
(52) U.S. Cl. .................. 428/377; 428/379; 428/383; 428/375; 174/116; 174/121 SR; 174/120 SR; 156/53; 156/286
(58) Field of Search .................. 428/379, 383, 428/375, 377; 174/113 R, 116, 121 SR, 120 SR; 310/45; 156/53, 286

(56) References Cited

U.S. PATENT DOCUMENTS

| 1,784,997 | 12/1930 | Schenkel . | |
|---|---|---|---|
| 2,705,292 | 3/1955 | Wagenseil . | |
| 2,939,976 | 6/1960 | Manni . | |
| 3,679,925 | 7/1972 | Fort | 310/196 |
| 3,870,982 | * 3/1975 | Shibano et al. . | |
| 4,318,020 | * 3/1982 | Meyer . | |
| 4,935,302 | * 6/1990 | Hjortsberg et al. . | |
| 5,066,881 | 11/1991 | Elton et al. | 310/213 |
| 5,067,046 | 11/1991 | Elton et al. | 361/220 |
| 5,175,396 | 12/1992 | Emery et al. | 174/36 |
| 5,574,325 | * 11/1996 | Von Musil et al. . | |
| 5,633,477 | 5/1997 | Smith et al. | 174/138 E |
| 5,945,764 | 8/1999 | Bendfeld . | |

FOREIGN PATENT DOCUMENTS

| WO9704515 | 2/1997 | (DE) . |
| 0 287 814 | * 3/1988 | (EP) . |
| 2082145 | 12/1971 | (FR) . |

* cited by examiner

*Primary Examiner*—Deborah Jones
*Assistant Examiner*—Jason Savage
(74) *Attorney, Agent, or Firm*—Eckert Seamans Cherin & Mellott, LLC

(57) ABSTRACT

A filler material for the exterior surface of a high voltage coil having Roebeled strands is described. The filler material comprises an epoxy resin impregnated felt which is wrapped in a low resistance conductive tape. The conductive tape reduces potential gradients across the filler material, thereby reducing the occurrence of unwanted electrical discharges in the filler voids.

17 Claims, 3 Drawing Sheets

METHOD TO REDUCE PARTIAL DISCHARGE IN HIGH VOLTAGE STATOR COIL'S ROEBEL FILLER

BACKGROUND OF THE INVENTION

1. Field of the Invention

The invention relates to insulation for covering high voltage components having irregular surfaces, and in particular concerns an improved filler material for a high voltage coil having Roebeled coil strands on its outer surface, wherein epoxy resin impregnated felt materials used to cover and insulate the Roebeled strands are wrapped in a low resistance conductive tape to reduce potential gradients across the filler material, thereby reducing the occurrence of partial discharges in the filler voids.

2. Prior Art

In order to minimize the losses which would occur in a multi-stranded coils as the result of eddy currents, the top and bottom strands of the coil are intertwined in a braid-like form, known as Roebeled strands. Roebeled strands form irregular surfaces on the top and bottom of the un-insulated coil.

Roebel fillers are insulating materials used for filling and smoothing the irregular surfaces formed by Roebeled strands. Roebel fillers heretofore known comprise resin impregnated felt materials or mica splittings which are bonded to the uneven coil surfaces by a process in which the impregnated materials are simultaneously heated and compressed, causing thermosetting resins to liquefy and fill voids of the irregular coil surfaces, and then to harden. The formed and bonded coil at this stage of manufacture is referred to as a "bakelized coil." Following completion of the bonding stage, a mica tape ground wall is formed around the consolidated coil and vacuum-impregnated with an epoxy resin. The coil is then pressed and baked to a final cure of the insulating structure.

Because the Roebel fillers are processed and cured to the coil surfaces under atmospheric conditions, air bubbles can be entrained in the fillers, forming voids in the hardened epoxy. Voids within the insulation system of high voltage stator coils can be a source of electrical discharges either during electrical testing or during operation of the coil in an electric machine. Electrical discharges or corona activity within a coil's insulation system can be detrimental to the integrity of the insulation and lead to early failure of the coil. In air cooled coils, partial discharges within the high voltage coil can lead to early failure of the complete stator winding.

Following the manufacture of the high voltage coils, each coil is subject to a series of electrical tests. One test that all coils must pass is the measurement of power factor tip-up. The power factor tip-up test results indicate how well consolidated the coil is, and the relative void content of the coil. A high voltage is applied to the coil under test, and the power factor is measured using a power factor bridge. Any internal discharges that occur in the coils cause an increase in the coils' power factor tip-up. The most likely source of partial discharges is unimpregnable, closed voids that are typically trapped bubbles in the epoxy resin associated with the Roebel filler material. Since the coil is bakelized at normal ambient pressure (1 atm.), the hardened epoxy resin traps some air. If trapped air in the cured epoxy resin is in the electric field path upon application of the power factor test voltage, then partial discharge activity can occur and cause a high power factor tip-up. The magnitude of power factor tip-up is a function of the level of applied voltage, the size of the void, and its position in the Roebel filler material.

The most effective way to eliminate electrical discharges in the insulating structure of a high voltage stator coil, and reduce power factor tip-up, is to produce an insulating structure which is void free. Since most voids are formed within the Roebel filler material by trapped air bubbles, one solution would be to process the filler coil in a vacuum. Unfortunately, this approach is cost prohibitive due to the expense associated with vacuum/heat impregnation. A more practical approach would be to prevent the voids within the Roebel filler material from discharging under the application of voltage.

U.S. Pat. No. 5,175,396, discloses a method for reducing partial discharges in filler voids which introduces a semi-conductive layer between the Roebel filler and the outer ground wall layer. The semi-conductive layer reduces the electrical stresses across the filler material to reduce the incidence of partial discharges in the filler voids.

U.S. Pat. No. 5,633,396, discloses a method for producing an electrically conductive felt impregnated an with epoxy resin, for insulating high voltage coils. The electrical pathways in the semiconductive felt reduce electrical stresses across the filler voids, thereby reducing the occurrence of electrical discharges in the filler materials.

While each of the above-mentioned methods has proven to reduce electrical discharges in the voids of filler materials used to insulate high voltage components, the manufacturing time and associated costs attributed to each process remain unfavorable. What is needed is an improved filler material for a high voltage coil having irregular surfaces, which is inexpensive to produce and effective in reducing the number of electrical discharges in the voids of the filler material under the application of high voltage.

SUMMARY OF THE INVENTION

These and other objectives are accomplished by the improved filler material according to invention. The filler material is structured to electrically isolate the epoxy impregnated felt from electrical fields generated by the high voltage coils such that potential gradients across the filler material are reduced, thereby decreasing the incidence of partial discharges in the voids of the filler material.

In one embodiment, the filler material comprises felt which is first impregnated with a non-conductive epoxy resin material and then wrapped with a low resistance conductive tape, such that the filler material is bondable to an exterior surface of a high voltage component. The conductive tape reduces potential gradients across the impregnated felt material, thereby reducing partial discharges in the voids of the impregnated felt.

The invention further contemplates a method for forming an insulating structure around an electrical component such as a high voltage coil having Roebeled strands for a high voltage device using the improved filler material. In this method, felt material is first impregnated with an epoxy resin and then wrapped with conductive tape to form an improved filler material. The filler material is then positioned on the irregular surfaces of the coil and cured to fill the voids formed by the Roebeled strands. The coil and filler material are next surrounded with a groundwall insulation which is vacuum-pressure impregnated with an epoxy resin. Finally, the coil and insulating structure are pressed and baked to obtain a final cure to the insulating structure.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
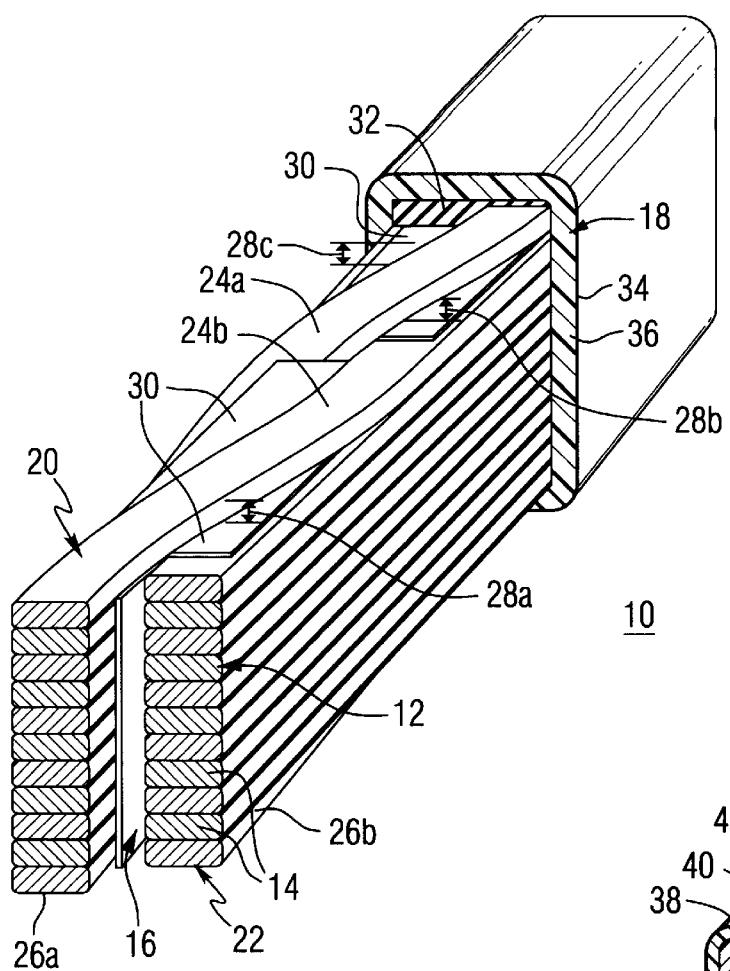
FIG. 1 is a perspective view of a coil section having Roebeled strands on its top and bottom ends which are covered by a first prior art insulating structure.

The invention is described with reference to the accompanying drawings wherein similar reference characters designate corresponding elements throughout the several views.

FIG. 1 shows a typical voltage coil 10, comprising an array 12 of individual coil strands 14 which are stacked in two juxtaposed columns. The strand array 12 includes one or more ventilation passageways 16 which conduct a heat dissipating gas such as hydrogen, during operation of the coil section. In the embodiment shown in FIG. 1, the strand array includes a ventilation passageway 16 between the two stacked columns of strands 14. In an alternative embodiment, the passageways can be incorporated into some of the strands themselves. Typically, the array 12 of coil strands 14 is covered in an insulating structure, an embodiment of which is shown in cross-section in the rear portion of the perspective view of the coil 10 shown in FIG. 1.

While the insulating wall structure of the invention can be advantageously used with any one of a number of high voltage components, it is particularly adapted for use with a high voltage coil section 10 of the type used in power generating alternators. Such coil sections in operation are mounted in the slots of a stator assembly of such an alternator. In order to maximize the efficiency of such power generating alternators, it is important to eliminate or at least reduce the amount of unwanted eddy currents flowing through the array 12 of coil strands 14 that form each of the coil sections 10. Accordingly, the strands on the top and bottom ends 20, 22 are "braided" to form Roebeled strands 24a, 24b and 26a, 26b, respectively. Roebeled strands have been shown effectively to neutralize energy-wasting eddy currents which would otherwise flow freely through the strand array 12. However the twisted, overlapping geometry of the Roebeled strands results in a number of irregular regions 28a, b, c on the top and bottom surfaces of the strand array 12. It is difficult for the insulating epoxy material which forms the bulk of the insulating structure 18 to completely fill these regions 28a, b, c without incorporating air bubbles which create void spaces in the insulation. To fully appreciate the problems associated with the formation of such void spaces, a specific understanding of the structure and the assembly of all the insulating materials between and around the strands 14 of the array 12 is necessary.

With continued reference to FIG. 1, the individual strands 14 of the coil 10 are insulated from each other by paper-thin insulating sheets, which can be formed, for example, by thin glass cloth which has been impregnated with an insulating epoxy resin. These layers 30 can be thin because even though the voltage conducted through the coil 10 may be as high as 24 kv, the voltage between individual adjacent strands 14 is about 5 volts, being caused only by the impedance of the individual coil strand 14 as the current flows through coil 10. By contrast, the difference in potential between the strands 14 of the coil and ground is on the order of 20 kv. Accordingly, much heavier insulation in the form of the previously mentioned insulating structure 18 surrounds the entire strand array 12.

One example of an insulating structure heretofore employed for use in connection with a high voltage coil array having Roebeled strands is shown in FIG. 1. This wall structure 18 generally comprises an inner filler material 32 formed from layers of epoxy impregnated Dacron or Nomex felt which are applied over the top and bottom ends 20, 22 of the strand array 12, and a ground wall 36 formed from a layer of mica tape impregnated with epoxy and disposed over the layer of felt 32 and completely around the strand array 12 as shown, and an outer conductive layer 34 formed from conductive paint.

In the manufacture of the illustrated embodiment of the insulating structure 18, tape-like strips of mica are wrapped around the strand array 12 after the layer of epoxy impregnated Dacron or Nomex felt has been applied over the top and bottom ends of the strand array 12. The entire coil is then simultaneously heated and compressed by means of a heatable press assembly (not shown), which brings the epoxy material in both layers to above their fusing temperature and finally to their thermosetting curing temperature. To complete the insulating structure a layer of conductive paint or varnish 34 is applied over the outer surface of the hardened epoxy and mica layer to complete the ground wall 36.

While the simultaneous liquefication and compression of the material that ultimately forms the inner insulating layer 32 does much to reduce the incidence of void spaces in the irregular regions 28a, b, c presented by the overlapping Roebeled strands 24a, b and 26a, b, it does not eliminate all void spaces. Accordingly, even under carefully controlled manufacturing conditions, the failure of the liquefied and compressed epoxy resin to fill all of the irregular spaces on the top and bottom surfaces of the coil array can result in a significant manufacturing rejection rate of the coil sections made.

Figure 2:
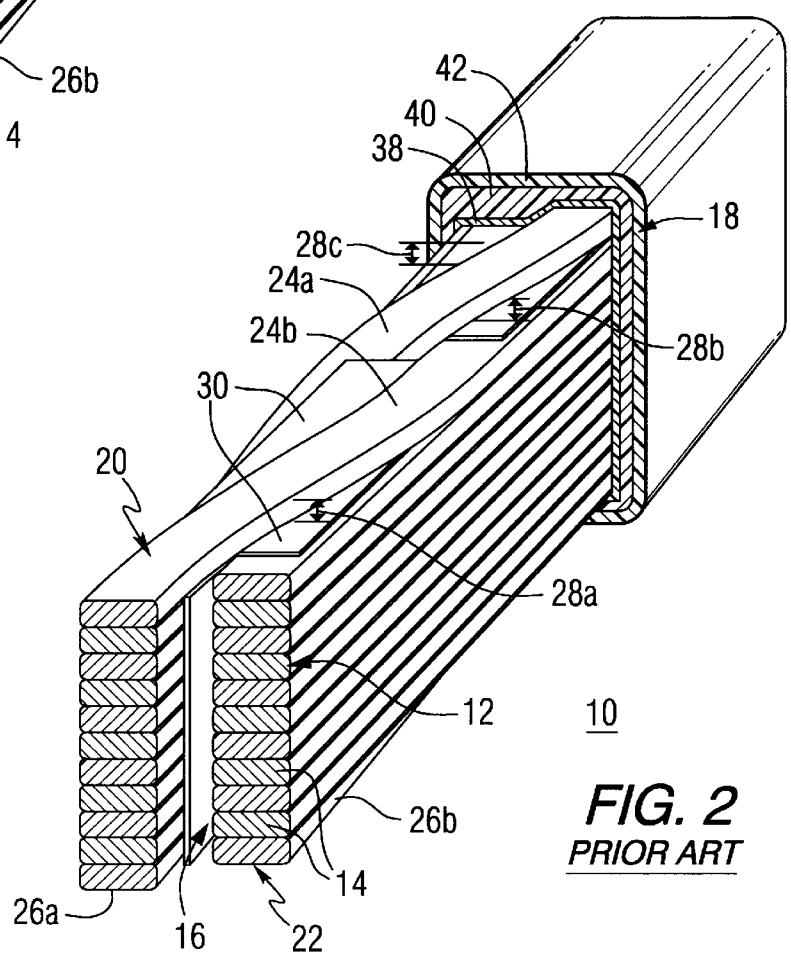
FIG. 2 is a perspective view of a coil section having Roebeled strands on its top and bottom ends which are covered by a second prior art insulating structure.

FIG. 2 shows another example of an insulating structure used in connection with high voltage coils having Roebeled strands. Like the previously discussed prior art, this insulating structure includes an inner filler material 38 formed from a nonconductive thermosettable epoxy material that is generally capable of filling the irregular spaces, 28a, b, c formed by the Roebeled strands 24a, b and 26a, b. However, unlike the insulating structure of FIG. 1, this structure includes a semi-conductive layer 40 between the inner filler material 38 and the ground wall 42. The semi-conductive layer 40 is formed from a paste of carbon-filled epoxy material that is fused with the nonconductive epoxy material forming the inner filler material and the ground wall. The semi-conductive layer reduces the electric stresses through the insulating structure which can cause partial discharges in the filler voids. The semiconductive layer can also be electrically connected to the coil array to further reduce the total electrical potential experienced within the inner filler layer.

Figure 3:
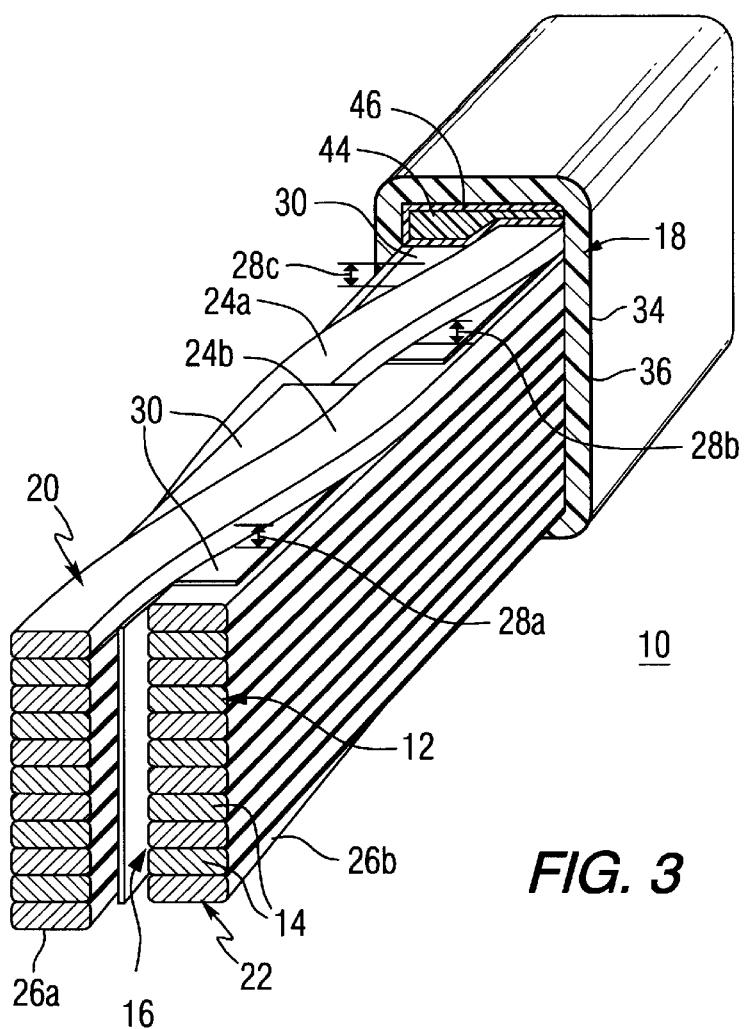
FIG. 3 is a perspective view of a coil section having Roebeled strands on its top and bottom ends which are covered with an insulating structure incorporating the improved filler material according to the invention.
Figure 4B:
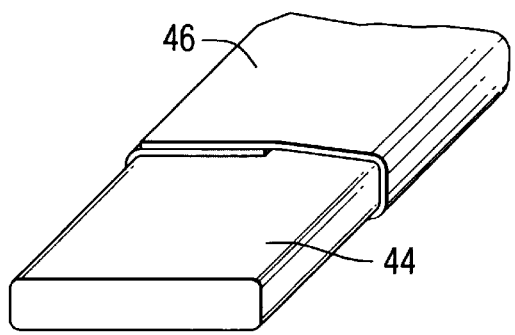
FIG. 4 is a perspective view of the improved filler material used to insulate Roebeled coil strands according to the invention.
Figure 4A:
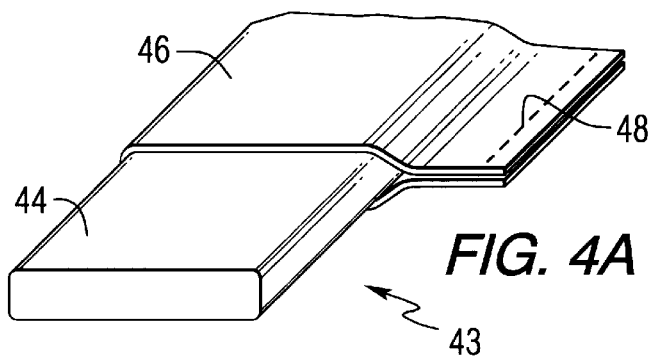

FIG. 3 shows an insulating structure according to the invention. This structure also includes an inner filler material 44 formed from a nonconductive thermosetting epoxy impregnated felt material. However, unlike the above insulating structures, the filler material 44 is wrapped in a low resistance conductive tape 46. To form the insulating structure, a strip of filler material 43 is prepared by covering a strip of resin impregnated felt material 44, preferably comprising Nomex or Dacron, with a low resistance conductive tape 46. The conductive tape 46 is folded around the impregnated felt 44 and the two open ends are stitched together forming a longitudinal seam 48, shown in FIG. 4A. An alternate method of wrap is to overlap the conductive tape as half or full lap as shown in FIG. 4B. Preferably, the conductive tape is a carbon based tape having a resistivity of about 400 ohms per square, and seam 48 is stitched together using Dacron thread. The filler material 44 is then positioned on the Roebeled coil strands, or other high voltage component, to fill any resulting voids.

In a typical coil design, the top and bottom Roebel filler material is made from an epoxy loaded felt made from either Nomex or Dacron. It is on the order of 0.135 inches thick, un-compressed. The amount of resin in the felt is a critical factor. To obtain good coil shape and proper fill of the Roebel offset voids, a resin loading of at least 65% is required. When the resin loading is high, the level of trapped bubbles in the resin is quite high and causes a high value of power factor tip-up when used without the conductive wrap. To reduce tip-up, a very light resin loading on the order of 25% can be used, with a sacrifice in coil cross-section shape, when used without the conductive wrap.

To ensure the electrical potential on the conductive Roebel filler is the same potential as the coil strands, the insulation on the top strands is removed at three locations along the coil length on both the coil top and bottom. After placement of the Roebel filler on the coils top and bottom, it is held in place by using a wrap of adhesive tape around the coil along the coil length at about every three feet. The coil is then bakelized to consolidate and cure the Roebel filler material.

Thereafter, a layer of groundwall insulation 18 is provided over the coil and filler material, and is vacuum impregnated with an epoxy resin to complete the insulating structure. The insulated coil is then placed in a heat-press assembly to obtain a fire cure of the insulating structure.

Experimental Test Results:

Two coils, each having Roebeled strands, were formed using the improved filler material. The two coils were completely processed following the normal manufacturing cycle. The coils were processed at a temperature of 164° C. for a time of 6 hours. The pressure was applied during cure at 500 PSI. The following test was conducted on the two experimental coils with corresponding results.

Figure 5:
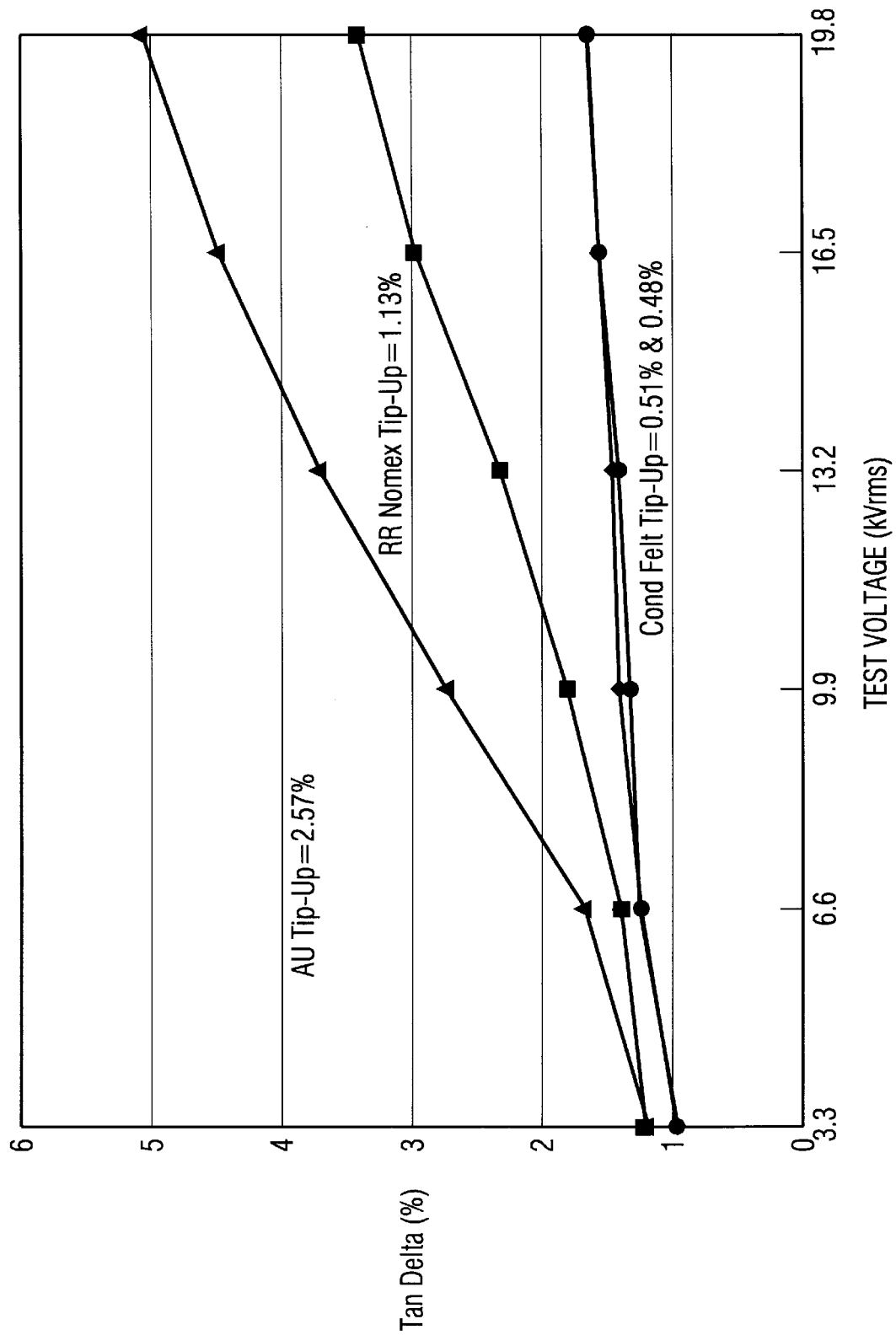
FIG. 5 is a comparison chart of power factor tip-up for coils with and without the improved filler material according to the invention.

1. Power Factor Tip-Up: Both coils were power factor tested and the power factor tip-up was calculated between 13.2 kVrms and 3.3 kVrms. The two coils had power factor tip-up of 0.51% and 0.48%. FIG. 5 is a graph of the power factor data obtained from the two coils incorporating the improved filler material as compared to power factor data obtained for two prior art coil designs having the resin rich Nomex and the resin rich Dacron polyester felt without. The abscissa (Y axis) of this graph represents a value known as "tangent delta," which is proportional to the amount of current losses which occur in a coil section as a result of unwanted electrical discharges in the insulating structure. The ordinate (X axis) of the graph represents electrical potential in kilovolts.

A better consolidated coil has resulted from the use of the resin rich felt wrapped with the conductive tape. Good coil cross-section shape was obtained with a low value of power factor tip-up. The low value of power factor tip-up suggest that the voids, although present, are electrically shielded by the use of the conductive tape outer cover around the resin rich Nomex felt.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A filler material for a high voltage component having an irregular outer surface comprising:
   (a) felt impregnated with a non-conductive epoxy resin material; and
   (b) a low resistance conductive cover positioned around said impregnated felt wherein said conductive cover substantially surrounds the entire perimeter of the felt across a given cross-section, said filler material being adapted to conform to said irregular outer surface of said high voltage component, such that said filler material is bondable to said outer surface of said high voltage component and said low resistance conductive cover reduces potential gradients across the impregnated felt, thereby reducing partial discharges in said impregnated felt.

2. The filler material of claim 1 wherein the resistivity of said conductive tape is about 400 ohms per square.

3. The filler material of claim 1 wherein conductive tape has a longitudinal stitched seam comprising a Dacron thread.

4. The filler material of claim 1 wherein said felt is selected from Nomex and Dacron.

5. The filler material of claim 1 wherein said conductive cover comprises carbon.

6. The filler material of claim 1 wherein the felt is at least 65% loaded with the epoxy resin.

7. An insulated coil for a high voltage device comprising:
   at least one Roebeled strand having top and bottom surfaces which are discontinuous;
   a filler material cured and bonded to at least one of said top and bottom surfaces of said Roebeled strand, said filler material comprising felt impregnated with a non-conductive epoxy resin, said felt being wrapped with a low resistance conductive cover; and
   a groundwall surrounding said Roebeled strand and said filler material, said groundwall having inner and outer layers, wherein said inner layer is nonconductive and said outer layer is conductive.

8. The insulated coil of claim 7 wherein the resistance of said conductive tape is about 400 ohms per square.

9. The insulated coil of claim 7 wherein conductive cover has a longitudinal stitched seam.

10. The insulated coil of claim 7 wherein said felt material is selected from Nomex and Dacron.

11. The insulated coil of claim 7 wherein said conductive cover comprises carbon.

12. The insulated coil of claim 7 wherein the felt is at least 65% loaded with the epoxy resin.

13. The insulated coil of claim 7 wherein at least one Roebeled strand has the top or bottom surface insulated and the insulation on either the top or bottom surface is removed on at least one discrete location along the length of the coil where the Roebeled strand interfaces with the filler material.

14. The insulated coil of claim 7 wherein the insulation is removed on either the top or bottom surface of the Roebeled at a plurality of discrete, spaced locations along the length of the coil.

15. In an insulated coil for a high voltage device having at least one Roebeled strand having top and bottom surfaces which are discontinuous, a filler material cured and bonded to at least one of said top and bottom surfaces of said Roebeled strand, said filler material being felt impregnated with a non-conductive epoxy resin, a groundwall surrounding said Roebeled strand and said filler material, said groundwall having inner and outer layers, wherein said inner layer is nonconductive and said outer layer is conductive, the improvement comprising:

a low-resistance conductive cover wrapped around said impregnated felt, whereby said conductive tape reduces potential gradients across said impregnated felt, thereby reducing partial discharges in said impregnated felt.

16. A method for forming an insulating structure around an electrical component such as a high voltage coil having Roebeled strands, comprising the steps of:

forming a felt impregnated with an epoxy resin;

wrapping said impregnated felt with conductive tape to form a filler material;

positioning said filler material on the Roebeled strands to fill the voids formed by the Roebeled strands;

curing the filler material under pressure and heat;

surrounding said Roebeled strands and said filler material with a groundwall insulation;

vacuum-pressure impregnating the groundwall insulation; and, pressing and baking the insulating structure to obtain a final cure.

17. The method of claim 16 wherein the conductive tape wrapped around said impregnated felt forms a longitudinal seam and the method of manufacturing further comprises the step of stitching said longitudinal seam with a Dacron thread.

* * * * *